United States Patent [19]

Morgner et al.

[11] Patent Number: 5,775,737
[45] Date of Patent: Jul. 7, 1998

[54] CONDUIT VIBRATION DECOUPLING DEVICE

[75] Inventors: Dietmar Morgner, München; Hans Deinhard, Kirchheim, both of Germany

[73] Assignee: Feodor Burgmann Dichtungswerke GmbH & Co., Wolfratshausen, Germany

[21] Appl. No.: 863,634

[22] Filed: May 27, 1997

[30] Foreign Application Priority Data

Jun. 25, 1996 [DE] Germany .................. 296 11 142.2

[51] Int. Cl.$^6$ ............................................ F16L 11/12
[52] U.S. Cl. ........................ 285/49; 285/301; 285/906
[58] Field of Search .................... 285/49, 300, 301, 285/226, 906, 330

[56] References Cited

U.S. PATENT DOCUMENTS

| | | | |
|---|---|---|---|
| 3,519,289 | 7/1970 | Haffer | 285/49 |
| 4,659,117 | 4/1987 | Holzhausen et al. | 285/49 |
| 4,928,998 | 5/1990 | Brandener | 285/49 |
| 5,083,817 | 1/1992 | Holzhausen et al. | 285/49 |
| 5,299,837 | 4/1994 | Lagier | 285/49 |
| 5,511,828 | 4/1996 | Kurek et al. | 285/49 |

FOREIGN PATENT DOCUMENTS

| | | |
|---|---|---|
| 2 418 333 | 9/1979 | France . |
| 4 009 215 | 10/1990 | Germany . |
| 4 317 333 | 1/1994 | Germany . |
| 4 417 407 | 11/1995 | Germany . |

Primary Examiner—Dave W. Arola
Attorney, Agent, or Firm—Griffin, Butler Whisenhunt & Szipl

[57] ABSTRACT

A conduit vibration decoupling device, particularly for exhaust systems of internal combustion engines, comprises a pair of axially spaced conduit connecting members connected with each other by a flexible, bellows-type connecting element, and a force transmitting means having at least axial elasticity for transferring forces between said conduit connecting members. The force transmitting means comprises a housing surrounding said. flexible connecting element and connected to at least one of the conduit connecting members by an articulated spring arrangement which comprises at least a pair of spring means circumferentially spaced from each other. Each spring means consists of at least a single leaf-type spring element which a) extends in a substantially radial plane of the decoupling device, b) is supported at the end portions thereof with axial clearance at portions of said housing circumferentially spaced from each other, c) is prevented from moving in a circumferential direction with respect to a longitudinal centerline, and d) engages at an intermediate portion thereof a recess formed in said conduit connecting member and oriented to said spring element. The spring means during movement of said conduit connecting member relative to said housing engages portions of said conduit connecting member defining the recess for transmitting a force therebetween.

15 Claims, 2 Drawing Sheets

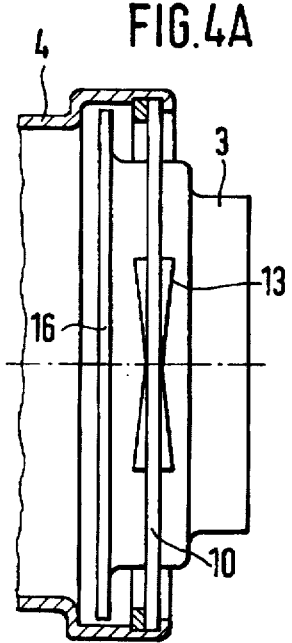
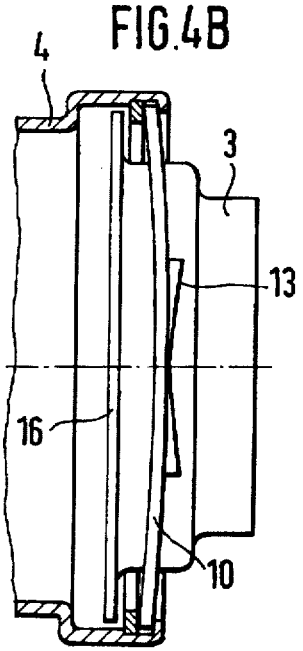
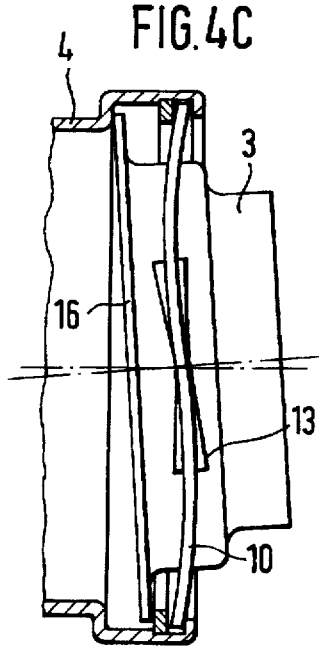
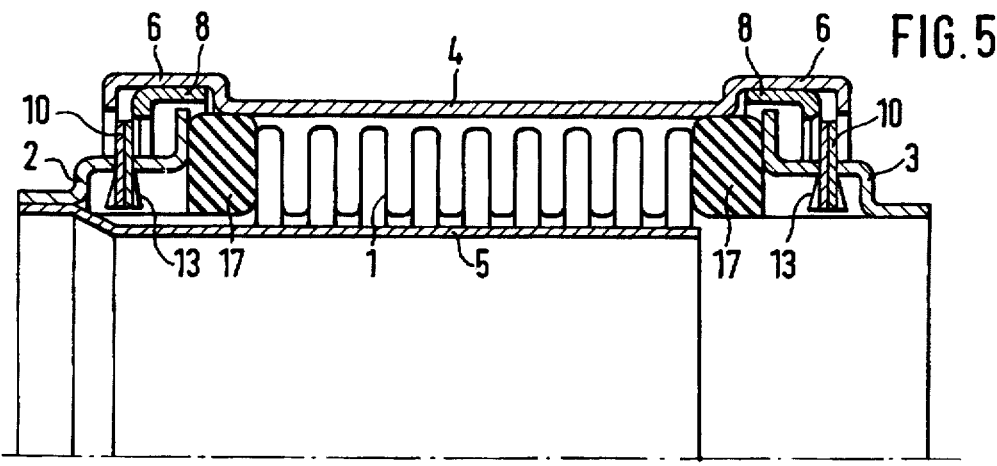
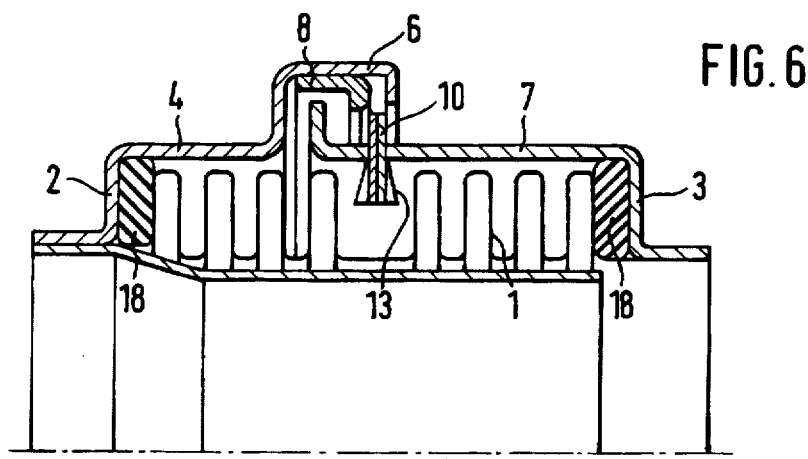

CONDUIT VIBRATION DECOUPLING DEVICE

The invention relates to a conduit vibration decoupling device, particularly for use in exhaust systems of internal combustion engines.

BACKGROUND OF THE INVENTION

The invention in particular relates to a fluid-tight decoupling device designed of a type which whilst allowing axial changes in length is sensitive to mechanical stresses, specifically torsional stresses, so that at least part of the forces acting between conduit connecting members provided at the axial ends of a decoupling device needs to be bypassed along a bellows-type A flexible connecting element extending between the conduit connecting members. Depending on the way in which an articulated spring arrangement is configured, permitting an axial and angular relative movement between the conduit connecting members without excessively stressing the bellows-type connecting element, two types of decoupling devices may be distinguished, one in which the articulated spring arrangement comprises a coil spring element extending about the longitudinal centerline of the decoupling device or a wire cable spring element, and another type in which individual spring units are provided at locations circumferentially spaced from each other on the decoupling device. Examples of decoupling devices of the first type are to be found in the following publications: DE-A-44 01 827, EP-A-0 432 436, EPA-0 615 5951 U.S. Pat. No. 3,369,829. The invention is directed at a decoupling device of the second type, as is known for instance from U.S. Pat. No. 5,299,827. In this known device three annular separate spring units are provided at locations disposed circumferentially offset from each other about a conduit connecting member in a radial plane. Each unit at diametral positions thereof is firmly connected to the housing or to the conduit connecting member, respectively. For accommodating the plurality of annular spring units a suitable space needs to be provided between the housing and the conduit connecting member so that the known decoupling device has the drawback of a comparatively large radial dimension and thus runs counter to the trend in the automotive industry towards lightweight, compact decoupling devices. A further drawback of the known devive is that the annular spring units fail. to protect the bellows-type corrugated connecting element, or only to a limited degree, from torsional stresses, as a result of which the useful life of such decoupling devices is reduced.

One object of the present invention is to provide a decoupling device of the second type having an articulated spring arrangement. of several independent spring units which can easily be designed compact in size whilst permitting effective protection of the bellows-type corrugated connecting element from mechanical stresses, more particularly torsional stresses. Another object of the present invention is to provide a decoupling device of the aforementioned type which is suitable for mass production in that it can be manufactered and assembled in an effective manner with little expenditure of costs and time. Another object of the present invention is to provide a decoupling device of the aforementioned type which enables it to adapt the spring response of the articulated spring arrangement optimally to the application in each case without this necessitating any substantial modifications to the basic structure of the decoupling device.

SUMMARY OF THE INVENTION

A conduit vibration decoupling device, particularly for use in exhaust systems of internal combustion engines, comprising a pair of axially spaced conduit connecting members connected with each other by a flexible, preferably bellows-type connecting element, and a force transmitting means having at least axial elasticity for transferring forces between said conduit connecting members, said force transmitting means comprising a housing surrounding said flexible connecting element and connected to at least one of the conduit connecting members by an articulated spring arrangement comprising at least a pair of spring means circumferentially spaced from each other, wherein each spring means comprises at least a single leaf-type spring element extending in a substantially radial plane of the decoupling device, supported at the end portions thereof with axial clearance at portions of said housing circumferentially spaced from each other, prevented from moving in a circumferential direction, and engaging at an intermediate portion thereof a recess formed in said conduit connecting member and oriented to said spring element, said spring means during movement of said conduit connecting member relative to said housing engaging portions of said conduit connecting member defining said recess for transmitting a force therebetween.

Accordingly, each articulated spring arrangement may include two or more spring means disposed circumferentially spaced from each other. Each spring means consists of one or more linear band-shaped leaf-type spring elements and is supported in a "floating" manner. i.e. not rigidly, with axial clearance at portions of the housing spaced . from each other circumferentially. Each spring means has a flat, linear configuration conducive to fabrication, the elasticity of which can be varied in broad ranges e.g. by varying the number of sandwiched leaf-type spring elements. Each spring means extends in a radial plane of the decoupling device and passes with clearance through a slot-like recess formed in the circumference of an adjacent conduit connecting member in a manner like a secant passes a circle whereby an axial movement of the conduit connecting member relative to the housing of the same decoupling device results in flexing of the spring means. The spring means not only permits an angular displacement of the conduit connecting member relative to the housing but at the same time it protects the flexible connecting element from torsional stresses by an engagement of the spring means with the slot-shaped recess preventing the conduit connecting member from twisting in an effective manner. Due to the "floating" support of the spring means at the housing and the non-rigid coupling of the spring means to the conduit connecting member these components can interact with each other with no stress. Further a substantial advantage of the invention is an easy assembly and fabrication of the decoupling device in that no welding or other connecting technologies are needed in forming the articulated spring arrangement. Instead, a simple beading operation is all that is needed for assembling the decoupling device in accordance with the invention. so that the fabrication costs are correspondingly low. The space required for the accomodation of the spring means in accordance with the invention is very small and hardly exceeds the radial dimensions of the flexible connecting element. The spring means can thus be provided directly within the housing so that the decoupling device is able to feature on the outside a smooth cylindrical configuration similar to that of a pipe section which makes for advantages in storage and in installation in internal combustion engines usually involving restricted space conditions. In addition, a closed, non-divided housing design, as made possible by the decoupling device in accordance with the invention, permits effective protection of the articulated spring arrangement as well as of the remaining components of the decoupling device from grit impact and other detrimental effects.

In accordance with a preferred embodiment of the invention each slot-like recess may have a gap width diverging between a minimum at a central portion of the recess and a maximum at the outer end portions thereof. The gap width may diverge continuously or incrementally. In both cases a force-transmitting engagement between the spring means and the conduit connecting member firstly occurs at a central portion of the slot-like recess only, and it is not until a further flexing of the spring means takes place that other portions of the slot-like recesses are involved, resulting in a continuous or incremental change in the spring response. Thus it is possible to alter the spring characteristic responsive to the degree of flexing of the spring means or a relative displacement between the housing and the corresponding conduit connecting member. Finally in accordance with a further embodiment of the invention a radial stop portion of the conduit connecting member extends into a space between a housing shoulder and the spring means to limit a relative movement between the conduit connecting member and the housing, namely to prevent an excessive relative movement therebetween. An effective overload protection is provided thereby in transportation, storage and operation which likewise contributes towards a long useful life of the decoupling device in accordance with the invention.

BRIEF DESCRIPTION OF THE DRAWINGS

FIGS. 4A–4C schematic views for explaining the relative positions of components of the decoupling device in accordance with the invention with different operating conditions.

FIG. 5 is a longitudinal partly sectionial view of the decoupling device in accordance with a second embodiment of the FIG. 6 is a longitudinal partly sectional view of a modified embodiment of a decoupling device in accordance with the invention.

DETAILED DESCRIPTION OF EMBODIMENTS OF THE INVENTION

Figure 1:
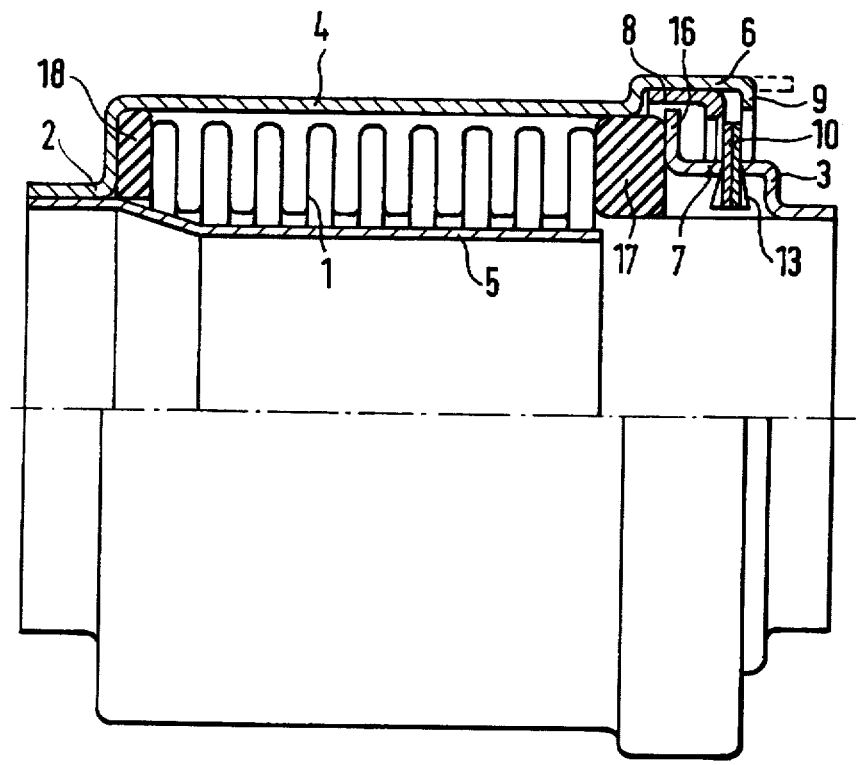
FIG. 1 is a longitudinal partly sectional view of a decoupling device in accordance with a first embodiment of the invention.

In the drawings same or similar parts or components are identified by like reference numerals. The invention will now be described in more detail with reference to the drawings.

Figure 2:
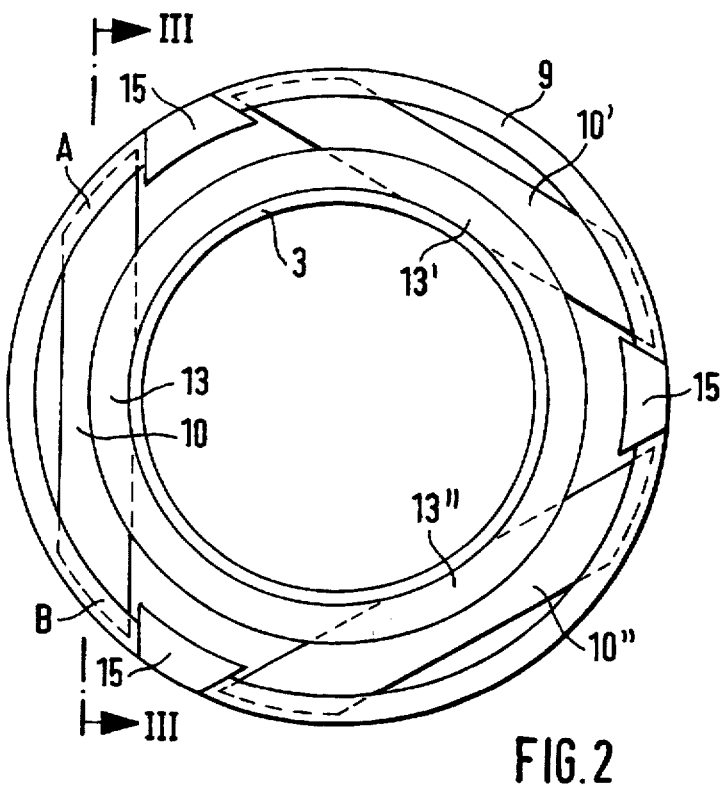
FIG. 2 shows the decoupling device of FIG. 1 as viewed from the right.
Figure 3:
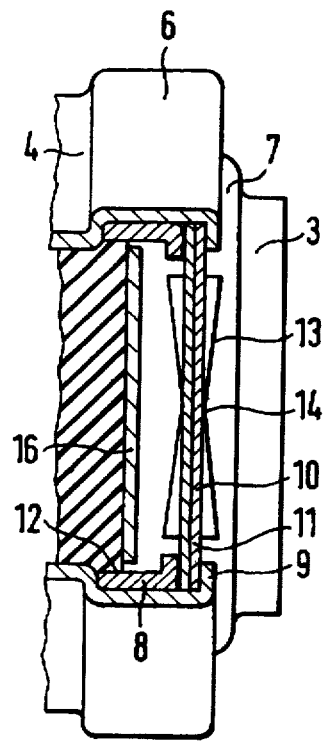
FIG. 3 is a fragmented sectional view along the section line III—III in FIG. 2.

In the following reference is made to the embodiment of the invention as shown in FIGS. 1–3. As illustrated the decoupling device comprises a bellows-type, corrugated, continuous, flexible connecting element 1 of a suitable material, such as a metal, which is firmly and sealingly connected at its axial tubular end portions to an upstream conduit connecting member 2 and a downstream conduit connecting member 3, respectively, e.g. by welding. By means of the conduit connecting members 2, 3 the decoupling device can be connected to the ends e.g. of an exhaust pipe (not shown) of an internal combustion engine.

Extending radially spacedy from the flexible connecting element 1 concentric to the longitudinal centerline thereof is a preferably cylindrical, rigid, elongated housing 4 as a kind of conduit section which surrounds the connecting element 1. The invention is, however, not restricted to such a configuration of the housing 4. Further, if desired, weight-saving openings or recesses may be provided in the housing 4.

Near the axial end of the housing 4 at its upstream or left side (as shown in the drawings) the housing 4 is firmly connected to the conduit connecting member 2. The conduit connecting member 2 may also be integral with the housing 4.

A tubular heat shield 5 is secured to the inner circumference of the conduit connecting member 2, at the upstream end thereof, e.g. by welding. The heat shield 5 extends coaxially to the connecting element 1 on the inside thereof, the free axial downstream end of the heat shield 5 being disposed in the vicinity of the downstream end of the corrugated section of the connecting element 1. The heat shield 5 has the task of protecting the connecting element 1, more particularly the corrugated section thereof from excessive heating by the exhaust gases of an internal combustion engine flowing through the decoupling device.

Near the other axial, downstream or (as shown in the drawings) right end, the housing 4 is flared in its diameter by a suitable dimension to receive an articulated spring arrangement, described in more detail in the following, by means of which the housing 4 is connected to the downstream conduit connecting member 3. The flared housing portion 6 forms at the transition to the base portion of the housing 4 an internal shoulder 12, cf. FIG. 3, which defines an internal abutment face. Protruding by a suitable dimension radially inwards from the outer axial end of the flared housing portion 6 is an annular flange 9 which defines another opposite internal abutment face.

A positioning ring 8 having a smaller axial dimension than that of a portion of the housing between the shoulder 12 and the abutment face of the annular flange 9 is received in the flared housing portion 6 and abuts with one of its axial ends the shoulder 12. The other axial end of the positioning ring 8 is located suitably axially spaced from the abutment face of the annular flange 9 thereby a space is defined between these parts, having an axial dimension which is somewhat larger than the thickness of a spring means 10 described in more detail in the following. The spring means 10 extends by its end portion into the space and is "floatingly" supported, i.e. with a suitable axial clearance, between the abutment face of the annular flange 9 and the adjacent end of the positioning ring 8. The opposite end portion (not. shown) of the spring means 10 is supported in a similar manner.

The spring means 10 comprises at least one band or strip-shaped leaf-type spring element 11 made of a steel material and having suitable dimension in the thickness and width directions. Preferably, two or more such leaf-type spring elements 11 are combined into a spring package having a desired thickness. The spring means 10 extends linearly as a kind of a secant in a radial plane of the decoupling device between supporting points A, B circumferentially spaced from each other on the flared housing portion 6. An intermediate portion of the spring means 10 engages an oriented slot-like recess 13 in the conduit connecting member 3 with a clearance, this recess being provided substantially in the same radial plane as that of the spring means 10. The slot-like recess 13 is fromed in a tubular coaxial portion 7 of the conduit connecting member 3 having an enlarged diameter.

At least two, preferably three, spring means 10 spaced from each other circumferentially by an equal angular distance are provided, as shown in FIG. 2, whereby each spring means 10 is assigned a slot-like recess 13 in the conduit connecting member 3. Sections 15 defined by the flange 9 and indicated by the broken line in FIG. 1, are bent or beaded to engage between the end portions of adjacent spring means 10 as an anti-torsional means to define the mutual circumferential position of the spring means 10. If desired, the sections 15 may also be placed between adjacent spring means 10 by other means than bending or beading. Defining the circumferential position of the spring means 10 could also be achieved e.g. by pins engaging the spring means 10 in the region of their supporting points A, B with clearance, these pins may protrude axially from the positioning ring 8 or annular flange 9.

An important feature of the invention is that neither the means defining the circumferential position, i.e. the flange sections 15, nor the means for supporting the end portions of the spring means 10, i.e. the annular flange 9 and the positioning ring 8, cause a rigid firm fit of the spring means 10, instead the spring means 10 are supported by these components in a "floating" manner, i.e. in clearance fit, only.

Each slot-like recess 13 through which a spring means 10 extends has preferably a gap width diverging from a central narrowest portion 14 to the outer ends of the recess, as is shown in FIG. 3. The gap width of the recess 13 at the narrowest portion 14 is adapted to the thickness of the spring means 10 so that the spring means 10 is able to engage the narrowest portion 14 with a suitable axial clearance. Due to the design as described each spring means 10 is a unit which is independent of the other spring means 10 of the decoupling device.

An axial relative movement between the conduit connecting member 3 and the housing 4 results in that due to the spring means 10 engaging the defining edges of the slot-like recess 13 initially only at the narrowest portion 14 thereof and later also at other portions—an axial spring force is exerted on the conduit connecting member 3 which becomes stronger the greater the flexing of the spring means 10 becomes. The strength of the spring force depends furthermore on the number of spring means 10 provided circumferentially on the conduit connecting member 3, the number, width and thickness of the leaf-type spring elements 11 making up each spring means 10, the free flexural length of the spring means 10, the configuration of the slot-like recess 13 as well as further design parameters. The spring force exerted by each spring means 10 can thus be individually varied within broad limits by properly selecting the cited parameters, optimally adapted to the corresponding application.

In the embodiments of the invention as described above and shown in FIGS. 1–3 the gap width of the slot-like recess 13 increases from the central narrowest portion 14 continuously linearly outwards. As an alternative the gap width could also be flared linearly outwards in a step-like or incremental manner. In this case a spring response becoming incrementally harder would result with increasing deflection of the spring means 10. Flaring the gap continuously or incrementally could also be obtained by a curved profile of the defining edges of the slot-like recess 13 so that the gap would be flared outwards in the form of a chalice. Finally, the gap could also be configured asymmetrical to a radial plane passing through the middle of the narrowest portion 14 of the slot-like recess 13. This would result in a different spring response of the spring means 10 for a relative movement between the conduit connecting member 3 and the housing 4 in the one or other axial direction.

As is further shown in FIGS. 1 and 3 the conduit connecting member 3 comprises a collar or stop portion 16 protruding radially outwards from the conduit connecting member 3 into a space defined between the shoulder 12 of the flared housing portion 6 and a bend at the outer axial end of the positioning ring 8. The collar 16 may engage the facing side of the bend, thereby one of a pair of limits of the axial movement of the collar 16 and thus of the conduit connecting member 3 is defined. The other axial limit is defined by the shoulder 12 of the flared housing portion 6 so that the axial movement of the conduit connecting member 3 relative to the housing 4 is limited by the axial dimension of the space between the shoulder 12 and the bend of the positioning ring 8.

It is to be noted that in a simplified modification of the invention the positioning ring 8 could be eliminated and the spring means 10 receiving itsy axial support by other means, e.g. by a housing shoulder or the like. In this case one of the limits for the axial movement of the collar 16 would be effected by the spring means 10 itself.

FIGS. 4A to 4C show in schematic views different positional relationships between the conduit connecting member 3 and the housing 4 in use of the decoupling device. FIG. 4A shows the position of the components in the starting condition with the spring means 10 unloaded so that the latter extends with no bends between the supporting points A–B and passing through the slot-like recess 13 with clearance. When the conduit connecting member 3 is offset axially from the housing 4, as is shown in FIG. 4B, the spring means 10 due to engaging one of the axial defining edges of the slot-like recess 13 flex in an axial direction which exerts on the conduit connecting member 3 a return force in the opposite direction tending to return the conduit connecting member to its starting position as shown in FIG. 4a. Depending on the rate of flexure the spring means 10 engage the recess 12 over a part or full length of the corresponding defining edge. When the collar 16 of the conduit connecting member 3 comes into contact with the spring means 10 (or as previously mentioned with a bend of the positioning ring 8) any further axial movement of the conduit connecting member 3 relative to the housing 4 is halted and the maximum flexure of the spring means 10 is defined thereby, too. FIG. 4c shows the positional relationship of the parts for an angular displacement of the conduit connecting member 3 relative to the housing 4. This angular displacement of the conduit connecting member 3 is possible within limits dictated by contact of a circumferential portion of the collar 16 with the shoulder 12 of the housing 4 and contact of a diametrally opposed circumferential portion of the collar 16 with the spring means 10 (or the above mentioned bend of the positioning ring 8). When the conduit connecting member 3 is displaced angularly a return moment is applied thereto by the spring means 10 which tends to return the conduit connecting member 3 into its coaxial relationship to the longitudinal centerline of the decoupling device.

A further feature of the decoupling device in accordance with the invention is that torsion of the conduit connecting member 3 relative to the housing 4 about the longitudinal centerline of the decoupling device is prevented by the spring means 10 or, if desired, permitted only within limits. This anti-torsion function is achieved by one of the circumferential outer end edges of the slot-like recess 13 engaging the facing side edge of the spring means 10. Engagement of the cited edges preventing any further twisting of the conduit connecting member 3 about the longitudinal centerline of the decoupling device.

FIG. 5 shows an embodiment of the invention in which an articulated spring arrangement configured as described above is provided near each axial end of the housing 4 so that in a departure from the embodiment shown in FIG. 1 the upstream conduit connecting member 2 is connected to the housing 4 not rigidly but likewise in flexible manner. The upstream conduit connecting member 2 with the tubular heat shield 5 connected thereto may thus be configured the same as the downstream conduit connecting member 3. Unlike the embodiment according to FIG. 1 that shown in FIG. 5 enables not only axial and angular but also lateral relative movements between the conduit connecting members 2, 3.

Finally FIG. 6 shows an embodiment of the invention which is a modification of the embodiment shown in FIG. 1, in that the articulated spring arrangement being displaced to an intermediate, e.g. central portion along the axial length of the decoupling device. For this purpose the downstream conduit connecting member 3 has a tubular section 7, elongated axially, which partly takes over the function of a housing whilst the actual housing 4 which is connected to the upstream conduit connecting member 2 is shortened axially by a corresponding dimension. The central position of the articulated spring arrangement necessitates further a modification of the bellows-type flexible connecting element 1 by it extending free of corrugations over an axial portion on both sides of a radial plane in which the spring means 10 extend. Otherwise the configuration of the articulated spring arrangement corresponds to that of the embodiment shown in FIG. 1 so that as regards further details thereof reference is made to FIG. 1 and the description thereof.

One feature common to the embodiments of the invention as described above is the optional provision of annular vibration damping inserts 17 or 18 at the axial ends of the connecting element 1. The damping insert 17 assigned to the conduit connecting members 3 cooperating with an articulated spring arrangement in the vicinity of the axial end of the housing 4 may be dimensioned axially larger than the damping insert 18 in the vicinity of the conduit connecting member 2 in which no articulated spring arrangement is provided. As is further evident from FIGS. 1 and 5 the radial collar 16 may be in contact with the corresponding damping insert 17 so that the vibration damping property of the damping insert 17 is exerted on both the connecting element 1 and the corresponding conduit connecting member 3. Instead of, or in addition to, the shown annular damping inserts 17, 18 a tubular damping insert (not shown) could be provided which would need to be arranged circumferentially to the connecting element 1 in a space between the outer circumference of the latter and the inner circumference of the housing 4.

Although the invention has been described above on the basis of embodiments in which the axial end supports of the spring means 10 are formed by the interaction of a positioning ring 8 and an annular flange 9 created e.g. by beading it will be appreciated that the invention is not restricted to such a positional location of the spring means 10. This positional location could also be achieved in some other way, e.g. by an annular groove in the flared housing portion 6 into which the spring means could be inserted. Also, instead of an integral annular flange 9 a sleeve part could be mounted on the flared housing portion 6 to produce a positional limit by a radial portion similar to that of the annular flange. Further modifications and other configurations of the component parts of the embodiments as described above will be apparent to a person skilled in the art from the present teaching without needing to be explained in more detail.

What is claimed is:

1. A conduit vibration decoupling device, particularly for use in exhaust systems of internal combustion engines, comprising a pair of axially spaced conduit connecting members connected with each other by a flexible connecting element, and a force transmitting means having at least axial elasticity for transferring forces between said conduit connecting members, said force transmitting means comprising a housing surrounding said flexible connecting element and being connected to at least one of the conduit connecting member by an articulated spring arrangement comprising at least a pair of spring means circumferentially spaced from each other, wherein each spring means comprises at least a single leaf-type spring element extending in a substantially radial plane of the decoupling device, supported at the end portions thereof with axial clearance at portions of said housing circumferentially spaced from each other, prevented from moving in a circumferential direction, and engaging at an intermediate portion thereof a recess formed in said conduit connecting member and oriented to said spring element, said spring means during movement of said conduit connecting member relative to said housing engaging portions of said conduit connecting member defining said recess for transmitting a force therebetween.

2. The decoupling device as set forth in claim 1, wherein said recess further having engaging portions disposed at an angle to said force-transmitting portions, said conduit connecting member engaging said spring means at said engaging portions for preventing the conduit connecting member from being twisted.

3. The decoupling device as set forth in claim 1, wherein said spring means crosses said conduit connecting member in a manner according to a secant crossing a circle.

4. The decoupling device as set forth in claim 1, wherein said spring means comprises a plurality of sandwiched leaf-type spring elements.

5. The decoupling device as set forth in claim 1, wherein two or more spring means and a corresponding number of recesses of said conduit connecting member oriented to said spring means are provided, said spring means and recesses are circumferentially spaced from each other in equal angular spacing.

6. The decoupling device as set forth in claim 1, wherein two or more spring means and a corresponding number of recesses of said conduit connecting member oriented to said spring means are provided, said spring means and recesses are circumferentially spaced from each other in differing angular spacing.

7. The decoupling device as set forth in claim 6, wherein said gap width diverges continuously.

8. The decoupling device as set forth in claim 6, wherein said gap width diverges incrementally.

9. The decoupling device as set forth in claim 1, wherein said recess has a slot-like configuration with a gap width diverging from a minimum at a central narrowest portion of the recess to a maximum at the outer end portions thereof.

10. The decoupling device as set forth in claim 7, wherein said gap width is symmetrical or asymmetrical relative to a radial plane centrally passing through said central narrowest portion of the recess.

11. The decoupling device as set forth in claim 1, in which said housing having first bent portions overlapping adjacent end portions of said spring means with axial clearance and second bent portions extending between adjacent spring means to prevent rotation thereof in a peripheral direction.

12. The decoupling device as set forth in claim 1, wherein a stop portion of said conduit connecting member extends in a space between a shoulder of said housing and said spring means to limit the movement of said conduit connecting member relative to said housing.

13. The decoupling device as set forth in claim 1, wherein a tubular heat shield is fitted at an upstream one of said conduit connecting members and extending to a location within said flexible connecting element.

14. The decoupling device as set forth in claim 1, wherein said articulated spring arrangement is provided close to or within at least one of the axial ends of said housing.

15. The decoupling device as set forth in claim 1, wherein said articulated spring arrangement is provided at an intermediate portion of said decoupling device.

* * * * *